US005704744A

United States Patent [19]

Kleine et al.

[11] Patent Number: 5,704,744

[45] Date of Patent: Jan. 6, 1998

[54] ARRANGEMENT FOR TRANSMITTING TORQUE IN A MANUALLY OPERATED TOOL

[75] Inventors: Werner Kleine, Achim; Josef Obermeier, Peiting, both of Germany

[73] Assignee: Hilti Aktiengeschaft, Furstentum, Liechtenstein

[21] Appl. No.: 643,813

[22] Filed: May 6, 1996

[30] Foreign Application Priority Data

May 4, 1995 [DE] Germany ........................ 195 16 034.7

[51] Int. Cl.[6] ........................ B23B 31/22

[52] U.S. Cl. ........................ 408/226; 408/239 R; 408/240; 279/19.6

[58] Field of Search ........................ 408/226, 240, 408/239 R, 238; 279/19.3, 19.4, 19.6, 22, 30, 75

[56] References Cited

U.S. PATENT DOCUMENTS

| | | | |
|---|---|---|---|
| Re. 35,174 | 3/1996 | Wanner | 408/226 X |
| 1,524,301 | 1/1925 | Haight | 279/19.3 |
| 3,543,613 | 12/1970 | Oboloy | 408/226 |
| 4,131,165 | 12/1978 | Wanner et al. | 279/19.3 X |
| 4,680,999 | 7/1987 | Kojima et al. | 279/75 X |
| 4,692,073 | 9/1987 | Martindell | 408/239 A X |
| 5,013,194 | 5/1991 | Wienhold | 408/240 |
| 5,062,749 | 11/1991 | Sheets | 408/240 |
| 5,326,199 | 7/1994 | Kleine et al. | 279/19.4 X |
| 5,397,203 | 3/1995 | Kleine et al. | 279/75 X |

FOREIGN PATENT DOCUMENTS

| | | | |
|---|---|---|---|
| 0005384 | 11/1979 | European Pat. Off. . | |
| 0476387 | 3/1992 | European Pat. Off. . | |
| 0579577 | 1/1994 | European Pat. Off. . | |
| 0584706 | 3/1994 | European Pat. Off. . | |
| 2248914 | 5/1975 | France . | |
| 2402113 | 7/1975 | Germany . | |
| 2408557 | 9/1975 | Germany . | |
| 2653082 | 5/1978 | Germany . | |
| 3413432 | 7/1985 | Germany | 408/226 |
| 3843465 | 6/1990 | Germany . | |
| 4316799 | 7/1994 | Germany | 408/226 |

OTHER PUBLICATIONS

European Search Report, No. EP 96 81 0136, dd. Sep. 19, 1996.

*Primary Examiner*—Daniel W. Howell
*Assistant Examiner*—Henry W. H. Tsai
*Attorney, Agent, or Firm*—Anderson Kill & Olick, P.C.

[57] ABSTRACT

An arrangement for transmitting torque from a chuck (5) in a manually operated tool to a tool bit (1) having an axially extending chuck section (2) insertible into the chuck. The chuck section (2) has axially extending entrainment faces (31) arranged to cooperate with correspondingly shaped torque transmitting faces (6) in the chuck (5). The chuck section (2) is arranged to cooperate with a device (7) in the chuck for retaining the tool bit and affording limited axial displaceability of the bit. The chuck section (2) is formed with at least one recess (4). The device (7) in the chuck includes a locking element (8) engageable in the recess. The locking element (8) is axially and radially displaceable both to a limited extent and the axial displaceability of the tool bit is possible at least in part, by the limited axial displaceability of the locking element (8).

13 Claims, 3 Drawing Sheets

ARRANGEMENT FOR TRANSMITTING TORQUE IN A MANUALLY OPERATED TOOL

BACKGROUND OF THE INVENTION

The invention is directed to an arrangement for transmitting torque from a chuck in a manually operated tool to a axially extending tool bit where the tool bit has a chuck section insertible into the tool chuck. The chuck section has axially extending entrainment faces arranged to cooperate with axially extending torque transmission faces in the chuck. The chuck has a locking element engageable in at least one recess in said chuck section for providing limited axial displacement of the tool bit.

Tool bits and tool bit chucks in manually operated tools, in particular for percussion or drilling tool bits, are matched to one another. The tool bit and the tool bit chuck of the manually operated tool form an arrangement for transmitting torque generated by the drive of the tool. In addition, means are arranged at the tool bit and the tool bit chuck for securing the tool bit against displacement axially out of the chuck. In known tools, rotary entrainment faces are provided in the chuck section of the tool bit for transmitting torque. Further, axially extending closed recesses are formed in the chuck section to secure the tool bit in the axial direction. The rotary entrainment faces cooperate with correspondingly arranged matching faces in the chuck, to transmit the torque produced by the drive of the tool to the tool bit. Locking members located in the chuck engage in the axially extending closed recesses in the shank and secure the tool bit from dropping out of the chuck. The locking members are fixed in the axial direction in the tool bit chuck. The limited axial mobility of the tool bit necessary for operation is made possible by the axial length of the closed recesses in the shank of the tool bit.

In the known arrangements for transmitting torque in manually operated tools, the section of the shank inserted into the chuck, where the axially extending closed recesses for axially fixing the tool bit are located, are not usable for transmitting torque. On the other hand, it is desired to transmit as much of the torque as possible from the tool drive to the tool bit. The location of the axially extending closed recesses in the base of the torque entrainment grooves for enlarging the entrainment faces is, as a rule, not possible, since the depth of the rotary entrainment grooves has been optimized on the one hand for making available as large as possible torque transmitting surfaces with, on the other hand, assurance of a sufficiently large tool bit diameter. An additional reduction of the tool bit cross section by locating the axially closed recesses in the base of the rotary entrainment grooves would unduly weaken the tool bit diameter and could result in a failure of the tool bit in these weakened sections. Moreover, the individual rotary entrainment grooves would become too narrow for housing adequately dimensioned locking elements. This occurs due to the large number of rotary entrainment grooves in the chuck section needed for good transmission of the torque. In this configuration of the base of the groove, the entrainment faces of the grooves would in any circumstance be impaired.

SUMMARY OF THE INVENTION

Therefore, the primary object of the present invention is to modify a tool bit and a matching tool bit chuck in a manually operated tool so that to the extent possible, the torque produced by drive of the tool can be transmitted to the tool bit. Excessive weakening of the tool bit, especially in its chuck section, is to be avoided and failure of the tool bit as a result is to be prevented. The limited axial mobility of the tool bit positioned in the tool bit chuck is to be maintained. Such an arrangement for transmitting torque is to be provided in a tool bit and tool bit chuck, whereby the tool bit can be inserted into the chuck without any complications and faulty insertion due to a mix up of the rotary entrainment grooves and the axial retention means is to be avoided. The tool bit should be simple and economical to manufacture and expensive or cumbersome fabrication application procedures are to be avoided.

In accordance with the present invention, the arrangement for transmitting torque includes a tool bit equipped with axially extending entrainment faces on its chuck section with the entrainment faces cooperating with correspondingly shaped matching faces in the tool bit chuck. In addition, the tool bit has means which interact with properly shaped means in the tool bit chuck for providing axial retention of the tool bit while affording a limited axial displacement of the tool bit. The means on the chuck section of the tool bit comprises at least one depression or recess cooperating with at least one correspondingly configured locking element in the tool bit chuck which can be displaced radially and axially both to a limited extent, wherein the axial displaceability of the tool bit is at least partly made possible by the limited axial displaceability of the locking element.

The torque transmission surface on the chuck section is increased by the construction of the tool bit and the tool bit chuck of the manually operated tool of the present invention. The axial safety or retention of the tool bit requires only a small depression or recess in the chuck section occupying only a very small region of the chuck section. The entire remaining axially extending region of the chuck section is available for transmitting torque and, quite clearly, more torque can be transmitted to the tool bit than in the previously known arrangements for torque transmission. Undue weakening of the tool bit in the region of its chuck section is avoided, since the depression is relatively small. Even if the depression is located at the base or bottom of the rotary entrainment groove in the chuck section, the cross section of the chuck section is only inconsequentially reduced. A cross sectional reduction can be completely avoided by locating the depression or recess in a raised region of the chuck section adjacent to a rotary entrainment groove. The limited axial mobility of the tool bit inserted into the chuck is preserved by the depression in the chuck section cooperating with at least one corresponding locking element of the tool bit chuck which locking element can be displaced radially and axially both to a limited extent. The axial displaceability of the tool bit is afforded at least partially by the limited axial displaceability of the locking elements.

Due to the arrangement of the tool bit chuck of the manually operated tool, there is no confusion between the rotary entrainment members and the axial retention means in the course of inserting the tool bit into the chuck. Contrary to the tool bits and the associated tool bit chucks known in the state of the art, regions equipped with the entrainment faces or the corresponding faces and the arrangement of the axial retention means are no longer similarly configured, whereby a tool bit can not be erroneously inserted. The insertion of the tool bit into the tool bit chuck is easily effected and can be performed at different angular positions of the tool bit depending upon the quantity of the depressions or recesses in the chuck section of the shank. The fabrication of the depressions or recesses in the chuck section of the tool bit can be effected very simply, for instance, by machining, cold working, and particular by rolling. Such methods are simple and cost effective which is of great significance due to the large number of tool bits being manufactured.

In a preferred embodiment of the invention, the depression in the chuck section has an axial extent substantially equal to the axial extent of the locking element. This makes it possible to keep the region, possibly lost by the depression as a surface for transmitting torque, as small as possible. The limited axial displaceability of the tool bit inserted into the tool bit chuck remains assured by a limited axial displaceability of the locking element.

It would seem to be advantageous, if the depression is located in the region of the chuck section spaced from the insertion end of the chuck section and if, in the inserted state of the tool bit, the depression is located in the region of the opening into the tool bit chuck. Preferably, the depression is located in the forward half of the chuck section relative to the working region of the tool bit. In this embodiment, the entrainment faces are moved as far as possible towards the working region of the tool bit. In this way, the torsional length, that is the distance between the entrainment faces and the tip or leading end of the tool bit carrying the cutting edges, can be maintained as small as possible and a better introduction of the percussion or impact energy into the insertion end of the chuck section of the tool bit can be maintained.

In an advantageous embodiment of the invention, at lease two depressions are provided approximately hemispherically shaped and equidistantly spaced apart around the circumference of the chuck section of the tool bit. This permits the tool bit to be inserted in different angular positions into the tool bit chuck, depending on the number of depressions in the chuck section disposed in diametrically opposed pairs, so that at least one of the depressions always cooperates with one locking element in the tool bit chuck.

The insertion of the tool bit into a chuck is facilitated in a preferred embodiment, where a depression is assigned to each of the entrainment faces. The quantity of the depressions placed in the tool bit shank corresponds to a number of the entrainment faces, and the tool bit can be inserted into the tool bit chuck in a number of angular positions. The retention is afforded by only one locking element. This has the advantage that each individual depression is subject to a low loading and the likelihood of deformation of a depression is reduced.

If the depressions are arranged around the circumference of the chuck section so that they form a circumferentially extending annular groove, then the allowable insertion orientation of the tool depends only upon the arrangement the entrainment faces on the chuck section and the matching faces in the tool chuck.

In another preferred embodiment of the invention, the entrainment faces on the chuck section are arranged as ledges, strips or grooves. The axial extent of the entrainment faces on the chuck section runs essentially perpendicularly to the circumference of the chuck section at which the depression or depressions are located. It is easy to fabricate the ledges, strips or grooves in the chuck section of the tool bit. The matching faces are provided at grooves or strips in the tool bit chuck and are also easy to fabricate. Torque transmission occurs along the full axial extent of the cooperating entrainment faces and matching faces.

It is advantageous if the locking element is adapted to the cross section of the annular groove in a region of its locking surface cooperating with the annular groove and comes to rest with its locking surface between two strips or grooves. A locking element with such a configuration has, as a rule, an asymmetrical shape which reliably prevents the element from dropping out of its retaining member. The locking surface of the locking element and the correspondingly shaped depression can be kept as small as possible. The locking element is preferably formed of carbide or hard metal alloy.

It is advantageous for the introduction of the force during torque transmittal, if the entrainment faces are inclined at an angle approximately 15° to 60° relative to a radial plane of the strips or grooves. This causes the introduced force to be divided into a force component running at right angles to a force transmission surface and into another force component extending parallel to it, thus affording an advantageous centering effect. The centering effect is enhanced by providing a second flank for each strip arranged to lead in the rotational direction in case of a groove, and to lag in the rotational direction in the case of a strip and which encloses an angle with the radial plane of the strip larger than that enclosed with the entrainment face. Accordingly, the strips of the grooves have an asymmetrical sawtooth-like shape in a transverse cross section of the chuck section.

In another advantageous embodiment of the invention, the entrainment faces on the chuck section are designed so that the outer surface of the cross section of the chuck section has the form of a sinusoidal curve. The cross section of the correspondingly designed matching faces in the chuck also has an outer surface similar to a sinusoidal curve. The entrainment faces on the chuck section and the matching faces in the tool bit chuck shaped in this manner travel largely without any shearing forces along each other. Accordingly, a reduction in the frictional losses and wear of the matching faces in the tool chuck can be kept very low. Notch effect stresses are avoided by the sinusoidal shape. The sinusoidal shape of the cross section of the chuck section and of the tool bit chuck can be varied with regard to their shape, for instance, by flattening the sinusoidal shaped surface in the region of the largest diameter of the rotary entrainment member affording clearance spaces at the chuck section in its inserted state. These clearance spaces act as dirt traps and can collect contamination material. The guidance surface between the chuck section and the chuck itself can be defined by the varying sinusoidal shape.

An uneven number of entrainment faces in the chuck section and of the corresponding matching faces in the tool bit chuck is provided in an advantageous embodiment of the invention. If the chuck section diameter is up to 10 mm, preferably it has five entrainment faces and corresponding matching faces are provided. If the chuck section diameter is in the range of 10 mm to 15 mm, up to seven entrainment faces and matching faces appear to be expedient. In the case of a chuck section diameter greater than approximately 15 mm, preferably up to eleven entrainment faces and corresponding matching faces are employed. With such quantity of entrainment faces and corresponding matching faces, the regions of the tool bit and the tool bit chuck carrying entrainment faces and matching faces are designed so as to be sufficiently stable at the given tool bit diameters. At the same time, the surface for torque transmission can be maintained as large as possible. The uneven number of entrainment faces and matching faces is also advantageous for vibration technology reasons. The slight asymmetry results in a changed force introduction through the tool bit tip provided by cutting edges which cause am expedient material removal behavior.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
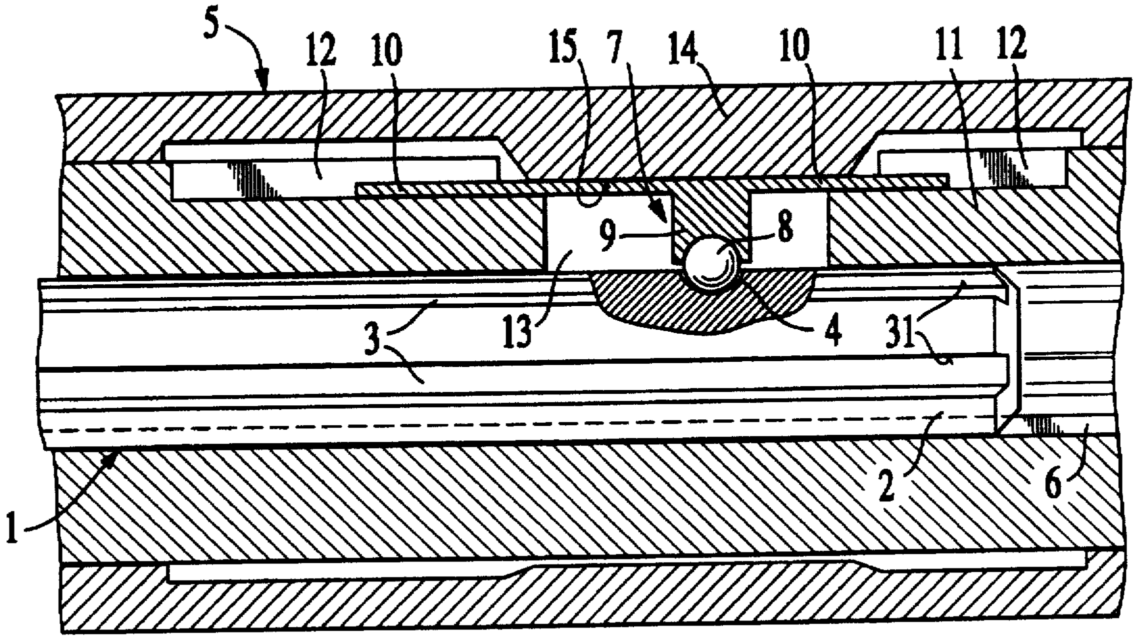
FIG. 1 is a partial axially extending section for transmitting torque from a tool bit chuck to a tool bit embodying the present invention.

In FIG. 1 a first embodiment of the invention is disclosed for transmitting torque. The arrangement of the invention comprises an axially extending tool bit 1 inserted in a tool bit chuck 5 forming part of a manually operated tool, and only the chuck is illustrated. In FIG. 1 only the chuck section 2 of the tool bit is illustrated inserted into the tool bit chuck 5. Axially extending entrainment faces 31 are formed on the chuck section 2 of the tool bit and cooperate with corresponding matching faces 6 on the tool bit chuck for transmitting torque to the tool bit 1. Torque is produced by an electrically driven manually operated tool. In the embodiment illustrated, the entrainment faces 31 of the chuck section 2 are placed in rotary entrainment grooves 3 arranged to receive correspondingly shaped entrainment ledges or strips 6 in the tool bit chuck 5. The tool bit 1 is arranged at its chuck section 2 to cooperate with corresponding means 7 in the tool bit chuck 5 for retaining the tool bit so that it can be displaced axially to a limited extent. In the embodiment shown in FIG. 1, the chuck section 2 has a small, preferably hemispherically shaped, depression 4. The means 7 in the tool bit chuck is formed preferably by a ball shaped locking element 8 retained in a block like member 9 which holds the locking element 8 and is axially displaceable to the limited extent in an axially extending groove 13. The axial extent of the groove 13 is greater than the axial dimension of the depression 4 in the chuck section 2. Correspondingly, the axial displacement travel of the locking element 8 is larger than the axial extent of the depression 4 in the chuck section 2. To afford the axial displacement of the block like member 9, it is provided with axially extending strips 10 which slide axially in slot-shaped recesses 12 in an outer surface of the tool bit chuck 5. An arresting sleeve 14 is located in the region of the recess 12 in the outer wall of the tool bit receptacle and the sleeve 14 has a cam shaped surface 15. In the arrested state, the cam shaped surface 15 presses on the axial length 10 of the member 9 and assures the axial security of the tool bit forming a connection with the chuck 5 by pressing the locking element 8 into the depression 4 in the chuck section 2. The cam shaped surface 15 is moved away from the strips 10 by turning the arresting sleeve 14 around the axis of the chuck 5. As a result, the strips tend to have radial play or clearance and can be displaced in the radial direction to release the chuck section 2.

Figure 5:
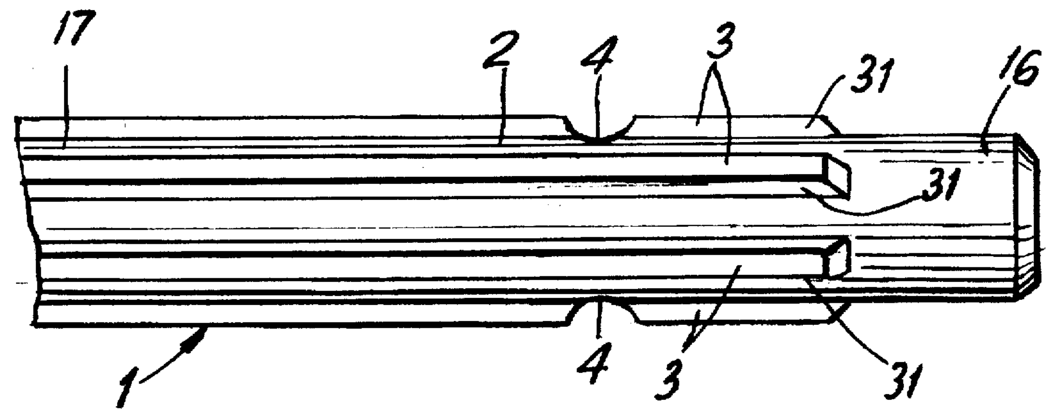
FIG. 5 is a partial axially extending view of a tool bit illustrating another embodiment of the invention.
Figure 6:
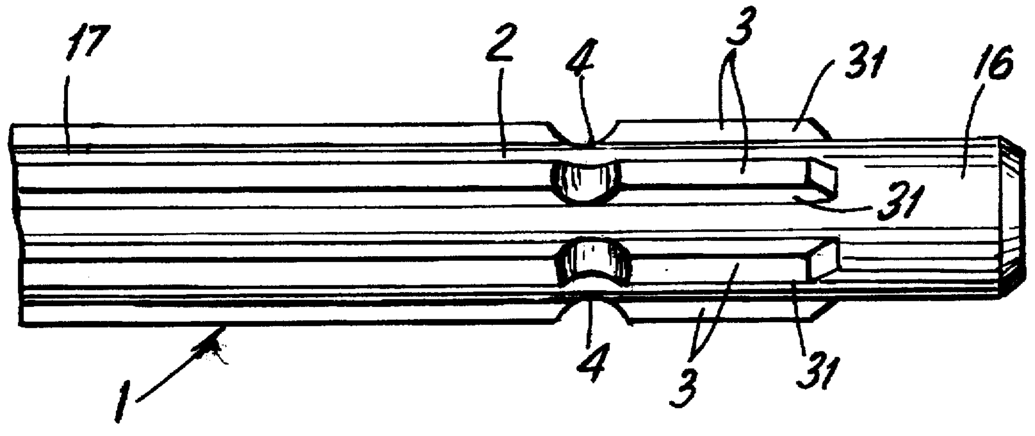
FIG. 6 is a view similar to FIG. 5 showing still another embodiment of the invention.

Only a hemispherically shaped depression is shown in the embodiment displayed in FIG. 1. It goes without saying that two or more depressions 4 can be formed in the chuck section 2 note FIG. 5. If two or more depressions 4 are used, they are preferably arranged in pairs and located diametrically opposite one another. In such an arrangement, the tool bit chuck can be equipped a number of locking elements 8, for instance two or four, located in pairs diametrically opposite one another and are retained analogously to the manner described above, as well as being axially displaceable together to a limited extent. Further, a depression or recess 4 can be provided in each entrainment face 31, note FIG. 6.

Figure 2:
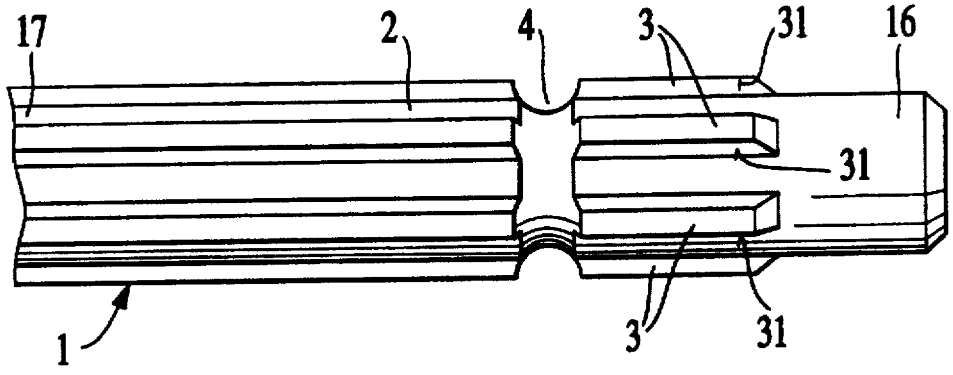
FIG. 2 is an axially extending side view of a tool bit illustrating a second embodiment of the invention.

FIG. 2 shows a second embodiment of a chuck section 2 of a tool bit, for the transmission of torque in accordance with the present invention. In this second embodiment the entrainment faces 31 are provided by axially extending ledges 3. The corresponding matching faces in the tool bit chuck, not shown, are arranged in axially extending grooves with a trapeze-like cross section. The depressions 4 are arranged around the circumference of the chuck section, so that they form a circumferentially extending annular groove. This has the advantage that upon insertion of the tool bit into the tool bit chuck, it is not necessary to pay attention to the arrangement of the depressions 4 in the chuck section 2. The angular positions, at which the tool bit can be inserted into the tool bit chuck, depends only on the disposition of the ledges 3 on the chuck section and the corresponding grooves in the tool bit chuck.

The ledges 3 with entrainment faces 31 in the embodiment illustrated do not extend to the insertion end 16 of the chuck section 2.

The insertion end 16 has a circularly shaped cross section and permits an annular seal (not shown) in the tool bit chuck so that it embraces the chuck section 2 in the region of the insertion end 16. This additional seal prevents dirt carried along by the ledges 3 from penetrating into the striking mechanism of the manually operated tool. It is obvious in the case of a tool bit with groove shaped rotary entrainment member, as shown in FIG. 1, that the grooves can be terminated spaced from the insertion end of the chuck section. In such an arrangement, the insertion end has a circularly shaped cross-section, which can be used for additional sealing. It is particularly advantageous if the depressions are so close to one another that a circumferential extending annular groove is formed in the region 17 spaced from the insertion end region 16, especially in the forward half of the chuck section 2. In the inserted position of the tool bit, the depressions 4 are located in the mouth region of the tool bit chuck. The entrainment faces can also be moved further into the forward region of the chuck section 2. This facilitates the arrangement of the circularly shaped insertion end 16, where the additional seal protecting against dirt penetration can be located. The introduction of the striking energy can be optimized without paying attention to the disposition of the entrainment faces. The torsional length, defined as the spacing between the entrainment faces and the tool bit tip carrying the cutting edge, is reduced.

Figure 3:
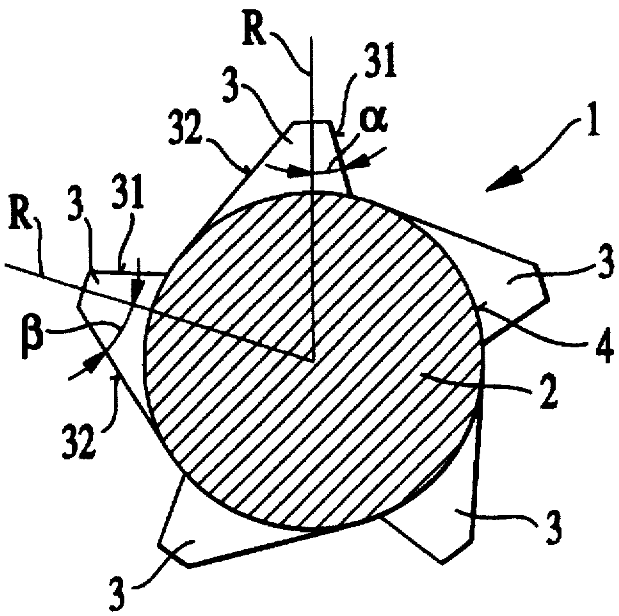
FIG. 3 is a cross sectional view of a chuck section of the tool bit displaying a third embodiment of the invention.

FIG. 3 displays in cross section another embodiment of a chuck section 2 of a tool bit 1 incorporating the present invention. The section is taken through the circumferentially extending annular groove. Further, in this embodiment the entrainment faces 31 are provided at ledges 3. The entrainment faces 31 are inclined at an angle α relative to the radial plane R of the ledges 3. Preferably, the angle α is in the range of 15° to 60°. The force component, introduced in the transmission of torque by the correspondingly shaped matching faces in the tool bit chuck, is divided into a component extending at right angles to the force transmitted surface and a force component extending parallel thereof, which affords an efficient centering effect. The centering effect is enhanced by the fact that each ledge 3 has a second flank 32 extending in the rotational direction enclosing an angle β with the radial plane off the ledge 3 larger than the angle α enclosed with the entrainment face 31. In the projection of the cross section of the chuck section 2, the ledges 3 have an asymmetrical, saw-toothed shape. While axially extending ledges 3 are shown in FIG. 3, asymmetrically shaped grooves can be provided in the chuck section 2, cooperating with corresponding shaped entrainment ledges in the tool bit chuck. In such a case, the second flanks trail in the rotational direction of the entrainment faces.

Figure 4:
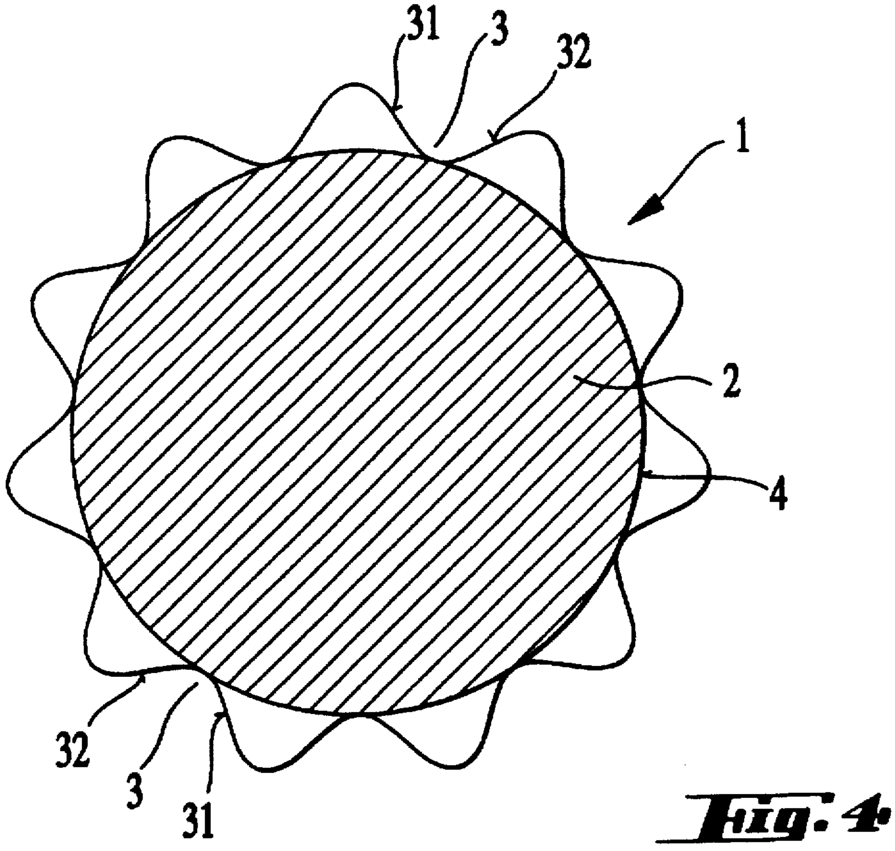
FIG. 4 is a cross sectional view through a chuck section of the tool bit of still another embodiment of the present invention.

FIG. 4 shows another embodiment of the invention in cross section for transmitting torque. The section is taken through depressions 4 forming a circumferentially extending annular groove in the chuck section 2. The entrainment faces 31 are provided along rotary entrainment grooves 3 affording a sinusoidally shaped outside surface. The cross section of the corresponding matching faces in the tool bit chuck form a sinusoidally shaped cross section. The shape of the matching faces in the tool bit chuck and the grooves in the chuck section can be arranged so that the assembly of the chuck section in the chuck results in projection, in a sinusoidal profile. The entrainment faces in the chuck section 2 and the matching faces in the chuck travel along one another without producing any shearing forces. Frictional losses and wear of the entrainment faces in the chuck section and of matching faces in the chuck can be kept very low. Stresses due to notch effect are prevented. The sinusoidal shapes can be varied, such as by flattening, whereby clearance spaces are formed with the tool bit inserted into the chuck. Such clearance spaces can function as dirt pockets and for the retention of contaminating material. The sinusoidal shapes can be modified for guidance of the tool bit in the chuck. The embodiment in FIG. 4 has rotary entrainment grooves with sinusoidal outside surfaces. It is evident that a sinusoidal shape can be provided for the rotary entrainment ledges.

The tool bit embodiments displayed in FIGS. 3 and 4 each have an uneven number of entrainment faces at the chuck section and of corresponding matching faces in the tool bit chuck. With chuck section diameter of about 10 mm, preferably up to five entrainment faces 31 (FIG. 3) and corresponding matching faces are provided. With chuck section diameter in the range of 10 mm to 15 mm, preferably up to seven entrainment faces and corresponding matching faces are provided. With chuck section diameter greater than 15mm, the number of the rotary entrainment faces 31 and matching faces is preferably up to eleven (FIG. 4). With this quantity of entrainment faces and corresponding matching faces, the regions of the tool bit with entrainment surfaces can be designed sufficiently stable at the stated tool bit diameter. At the same time, the surface available for torque transmission can be made as large as possible. The uneven numbers of entrainment faces has an advantageous effect on the working behavior of the tool bit in actual operation. It goes without saying that the geometries of the entrainment faces and the axial retention and the quantity of the entrainment faces and the matching faces can be combined in any random manner in the embodiments shown in the drawings.

The inventive arrangement of the tool bit and the tool bit chuck of the manually operated tool permits an increase in the torque transmission surface available at the chuck section. The axial retention or safety devices of the tool bit involves only a small depression in the chuck section and uses only a very small region of the chuck section. The entire remaining region of the chuck section is available for transmitting torque, and clearly more torque can be transmitted to the tool bit than in known torque transmittal arrangements. Excessive weakening of the tool bit in the region of the chuck section is avoided, since the depressions are relatively small. The limited axial mobility of the tool bit inserted into the tool bit chuck is preserved.

Due to the inventive arrangement of the tool bit and tool bit chuck of the manually operable tool, the tool bit can not be incorrectly inserted into the chuck. Contrary to the tool bits and associated tool bit chucks available in the state of the art, the regions of the tool bit having entrainment faces and the regions for axial retention are no longer shaped to be similar. The insertion of the tool bit into the tool bit chuck is easy to carry out and can be effected at different angular positions of the tool bit depending on the quantity of depressions in the chuck section The formation of the depression in the chuck section of the tool bit can be effected very simply, for instance, by machining or cold working, especially rolling. These methods are simple and economical, which is very important for tool bits fabricated in large quantities.

While specific embodiments of the invention have been shown and described in detail to illustrate the inventive principles, it will be understood that the invention may be embodied otherwise without departing from such principles.

We claim:

1. Arrangement for torque transmission in manually operable tools with a tool bit (1) insertable into a tool bit chuck (5), said tool bit comprises an axially extending chuck section (2) insertable into said chuck, said chuck section (2) having axially extending entrainment faces (31) arranged to cooperate with axially extending torque transmission faces (6) in said chuck (5), first means in said chuck section (2) cooperating with second means (7) in said chuck (5) for affording retention of the said tool bit (1) within said chuck and for providing limited axial displacement of said tool bit, said first means (4) comprises at least one recess in said chuck section (2), said second means (7) comprises a locking element (8) arranged to cooperate with said recess (4) and said locking element (8) being axially and radially displaceable both to a limited extent and the limited axial displaceability of said tool bit (1) being afforded at least partially by the limited axial displaceability of said locking element (8) and said recess (4) in said chuck section (2) has an axial extent substantially equal to the axial extent of said locking element (8).

2. Arrangement, as set forth in claim 1 wherein said chuck section has a forward region (17) spaced from an insertion end (16) of said chuck section inserted first into a mouth region of said tool chuck (1), and said recess (4) located in the said forward region (17).

3. Arrangement, as set forth in claim 2, wherein at least two recesses (4) being located in said chuck section (2) and said recesses being approximately hemispherically-shaped and equidistantly spaced from one another around a circumference of said chuck section (2) of said tool bit (1).

4. Arrangement, as set forth in claim 2, wherein one said recess (4) is provided for each said entrainment face (31).

5. Arrangement, as set forth in claim 2, wherein said recesses (4) are arranged around the circumference of said chuck section (2) for forming a circumferentially extending annular groove (4).

6. Arrangement, as set forth in claim 5, wherein said axially extending entrainment faces (31) in said chuck section (2) being located in ledges (3) and extending substantially perpendicularly to the circumference of said chuck section (2) in which the recesses (4) forming said annular groove (4) are arranged.

7. Arrangement, as set forth in claim 6, wherein said locking element has a locking surface being matched to a cross section of said annular groove in the region of the locking surface and being located with the locking surface between at least two said ledges.

8. Arrangement, as set forth in claim 7, wherein said ledges (3) having said entrainment faces (31) inclined relative to a radial plane of said ledges at an angle (α) in the range of approximately 15° to 60°.

9. Arrangement, as set forth in claim 8, wherein said ledges (3) comprise second flanks (32) spaced circumferentially from said entrainment faces (31) and inclined relative to the radial plane (R) of the ledges at an angle (β) larger than the angle (α) of said entrainment faces (31).

10. Arrangement, as set forth in claim 6, wherein said ledges (3) arranged on said chuck section (2) having a sinusoidally shaped outside contour.

11. Arrangement, as set forth in claim 10, wherein said chuck section (2) having an uneven number of said entrainment faces (31) and of said correspondingly arranged matching faces (6) in said tool bit chuck (5), wherein the number of said entrainment faces and matching faces being five for chuck section diameter up to 10 mm.

12. Arrangement, as set forth in claim 10, wherein said chuck section (2) having an uneven number of said entrainment faces (31) and of said correspondingly arranged matching faces (6) in said tool bit chuck (5), wherein the number of said entrainment faces and matching faces being seven for chuck section diameter in the range of 10 mm to 15 mm.

13. Arrangement, as set forth in claim 10, wherein said chuck section (2) having an uneven number of said entrainment faces (31) and of said correspondingly arranged matching faces (6) in said tool bit chuck (5), wherein the number of said entrainment faces and matching faces being up to eleven for chuck section diameter greater than 15 mm.

* * * * *

UNITED STATES PATENT AND TRADEMARK OFFICE

CERTIFICATEOF CORRECTION

PATENT NO. : 5,704,744

DATED : January 6, 1998

INVENTOR(S) : Werner Kleine, et al

It is certified that error appears in the above-identified patent and that said Letters Patent is hereby corrected as shown below:

On the title page:

{73} Assignee: Hilti Aktiengesellschaft, Furstentum Liechtenstein

Signed and Sealed this

Seventh Day of April, 1998

Attest:

BRUCE LEHMAN

*Attesting Officer*

*Commissioner of Patents and Trademarks*